(12) United States Patent
Iida et al.

(10) Patent No.: US 11,048,900 B2
(45) Date of Patent: Jun. 29, 2021

(54) IMAGE READING DEVICE AND METHOD

(71) Applicant: Hitachi-Omron Terminal Solutions, Corp., Tokyo (JP)

(72) Inventors: Makoto Iida, Tokyo (JP); Shoko Isono, Tokyo (JP); Takaaki Fujii, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 2 days.

(21) Appl. No.: 16/510,094

(22) Filed: Jul. 12, 2019

(65) Prior Publication Data

US 2020/0143132 A1  May 7, 2020

(30) Foreign Application Priority Data

Nov. 7, 2018 (JP) .............................. JP2018-210104

(51) Int. Cl.
*G06K 7/10* (2006.01)
*G06K 7/14* (2006.01)
*H04N 5/58* (2006.01)

(52) U.S. Cl.
CPC ......... *G06K 7/1456* (2013.01); *G06K 7/1417* (2013.01); *G06K 7/1473* (2013.01); *H04N 5/58* (2013.01)

(58) Field of Classification Search
USPC ........................ 235/462.01, 462.14, 379, 383
See application file for complete search history.

(56) References Cited

U.S. PATENT DOCUMENTS

| | | | |
|---|---|---|---|
| 2017/0280115 A1* | 9/2017 | Hatagi | G09G 3/3406 |
| 2019/0228503 A1* | 7/2019 | Tokuchi | G10L 15/07 |
| 2020/0410469 A1* | 12/2020 | Mikami | G07G 1/00 |

FOREIGN PATENT DOCUMENTS

JP  2007-102624 A  4/2007

* cited by examiner

*Primary Examiner* — Tuyen K Vo
(74) *Attorney, Agent, or Firm* — Foley & Lardner LLP

(57) ABSTRACT

Proposed are an image reading device and method of a simple configuration which can be easily operated intuitively by the operator, and which enables the accurate reading of a 2D code. With the image reading device which optically reads an image and the image reading method to be executed by the image reading device of the present invention, a first aerial image, which indicates a position over which the image is to be placed, is aerially formed at a focal position of the camera, the image placed in conformity with the first aerial image is read with a camera, and the first aerial image is aerially formed at a focal position of the camera.

4 Claims, 9 Drawing Sheets

IMAGE READING DEVICE AND METHOD

TECHNICAL FIELD

The present invention relates to an image reading device and an image reading method and, for instance, can be suitably applied to an automatic transaction apparatus.

BACKGROUND ART

When inputting information in a device based on a 2D code image prepared in advance (hereinafter simply referred to as the "2D code") in an end user operation-type automatic transaction apparatus or the like, a stand-alone type 2D code reader based on an optical image reading system (camera reading system) is built into the device.

Here, because the reading unit which reads the 2D code is fixed within the automatic transaction apparatus, unless the end user adjusts the position over which the 2D code is to be placed and maintains a constant distance to the reading camera (sensor), the read image will become blurred. When the read image becomes blurred, because image recognition will be unsuccessful and the 2D code cannot be read correctly, an operation guide for maintaining the 2D code at the lens focal position on the central axis of the coverage of the reading camera is required.

With a conventional automatic transaction apparatus or the like, provided is a physical operation guide for enabling the end user to more easily place the 2D code over the focal position of the reading camera, and the reading of the 2D code by the reading camera is thereby stabilized.

Nevertheless, with this system, because a physical guide structure that matches the size of the 2D code to be read will be required, for instance, a physical guide that matches a variety of screen sizes is required when a 2D code is displayed on the screen of the smartphone and is to be subsequently read by the device, and there is a problem in that the structure becomes complex.

Moreover, as another system, there is a type in which the 2D code being read is displayed together with guidelines on an operation screen mounted at a position that is different from the position over which the 2D code is to be placed, and urges the end user to adjust the position of the smartphone that he/she is holding. With this system, because the end user is required to perform operations while looking at two different places; specifically, the guide screen and one's own hand, an end user who is unfamiliar with the operation will have difficulty understanding the position over which the smartphone is to be placed, and this is undesirable as the read image tends to become blurred.

Meanwhile, PTL 1 discloses an information reading device comprising a liquid crystal display provided so as to substantially cover a reading port, a surface light source which emits illuminating light to the outside through the reading port, a light receiving optical system having a light receiving sensor for receiving light from an outside surface to be read through the reading port, and a control unit which controls the liquid crystal display, the surface light source and the light receiving optical system, wherein the control unit causes the liquid crystal display to be in a non-display state during the reading of the information code and controls the light receiving optical system to output light receiving signals according to the amount of light received from the reading port, and displays information on the liquid crystal display and causes the surface light source to emit light so that the surface light source becomes the backlight of the liquid crystal display during the display of information.

According to the information reading device having the foregoing configuration, because there is no need to provide a physical guide structure that matches the size of the 2D code to be read and because the end user is not required to perform operations while looking at two different places; specifically, the guide screen and one's own hand, there is an advantage in that, even for an end user who is unfamiliar with the operation, it is easy to understand the position over which the smartphone is to be placed, and the read image will not become blurred easily.

CITATION LIST

Patent Literature

[PTL 1] Japanese Patent Application Publication No. 2007-102624

SUMMARY OF THE INVENTION

Problems to be Solved by the Invention

Nevertheless, according to the information reading device disclosed in PTL 1, the end user is required to hold the display surface of one's smartphone or mobile phone, on which a bar code or a 2D code is displayed, to be in contact with the liquid crystal display or at a position that is extremely close to the liquid crystal display, according to the guidance displayed on the liquid crystal display (for instance, "Please place the bar code over this area").

Thus, there is a possibility that the end user may erroneously cause one's smartphone or mobile phone to collide with the display surface (surface of the dust-proof plate in the Examples of PTL 1) of the liquid crystal display of the information reading device, and there was a possibility that the display surface of the end user's smartphone or mobile phone, or the display surface of the liquid crystal display of the information reading device, may become damaged due to such collision.

The present invention was devised in view of the foregoing problems, and an object of this invention is to propose an image reading device and method of a simple configuration which can be easily operated intuitively by the operator, and which enables the accurate reading of images while dramatically reducing the possibility of the end user damaging his/her smartphone or the like.

Means to Solve the Problems

In order to achieve the foregoing object, the image reading device of the present invention which optically reads an image is provided with a camera for reading the image, and an aerial imaging module which aerially forms a first aerial image, which indicates a position over which the image is to be placed, at a focal position of the camera.

Moreover, the present invention additionally provides an image reading method to be executed by an image reading device which optically reads an image, comprising a first step of aerially forming a first aerial image, which indicates a position over which the image is to be placed, and a second step of reading, with a camera, the image placed over the position which conforms with the first aerial image, wherein, in the first step, the first aerial image is aerially formed at a focal position of the camera.

According to the image reading device and image reading method of the present invention, the image can be guided to a focal position that is optimal for reading the image without requiring any physical guide structure. Moreover, according to the image reading device and image reading method of the present invention, because the first aerial image is aerially formed, it is possible to dramatically reduce the possibility of the user erroneously causing one's smartphone or the like, on which the image is displayed, to collide with the image reading device.

Advantageous Effects of the Invention

According to the present invention, it is possible to realize an image reading device and method of a simple configuration which can be easily operated intuitively by the operator, and which enables the accurate reading of a 2D code while dramatically reducing the possibility of the end user damaging his/her smartphone or the like.

DESCRIPTION OF EMBODIMENTS

An embodiment of the present invention is now explained in detail with reference to the appended drawings.

Figure 1:
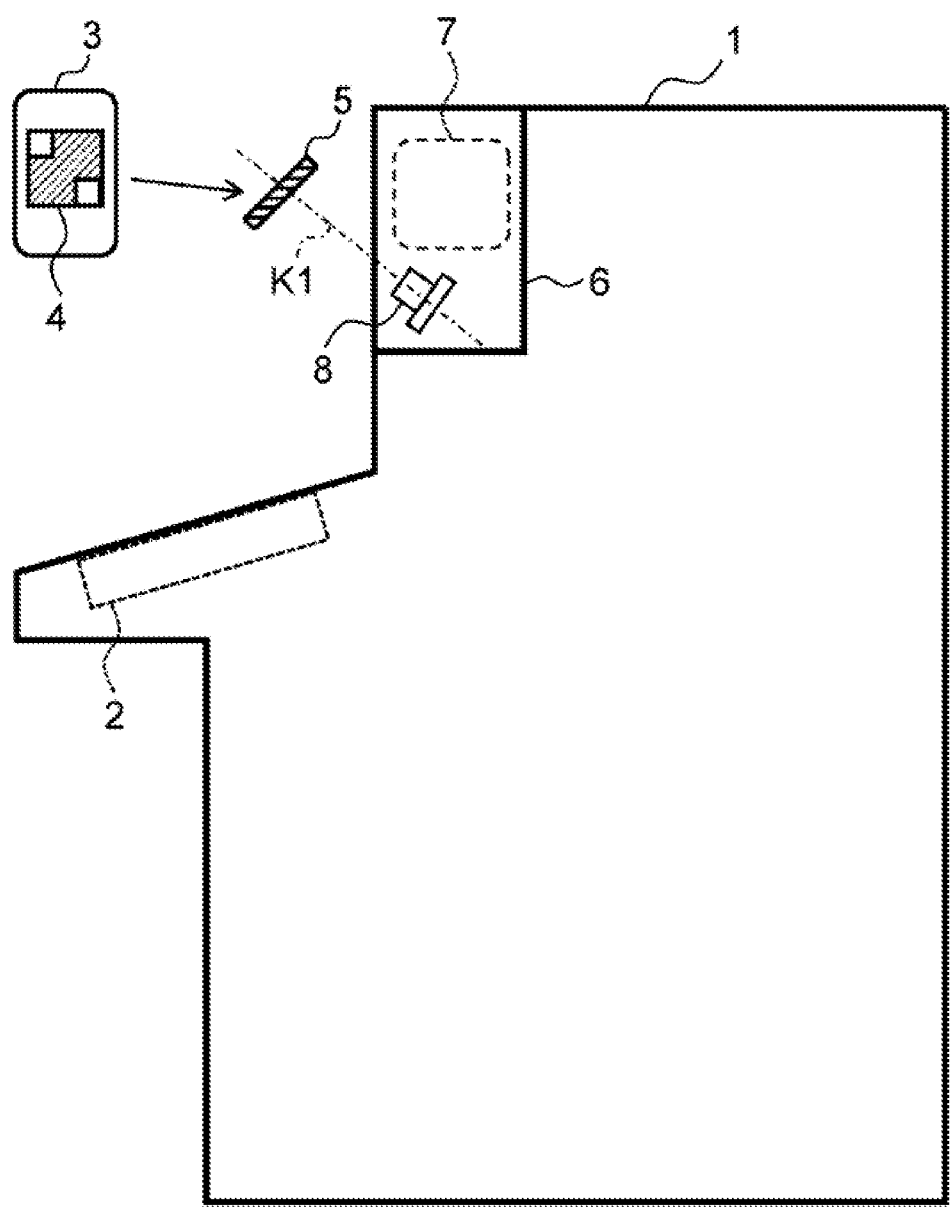
FIG. 1 is a conceptual diagram showing a schematic configuration of the automatic transaction apparatus according to this embodiment.

FIG. 1 shows a configuration of an automatic transaction apparatus 1 according to this embodiment. The automatic transaction apparatus 1 is equipped with, in addition to a touch panel display 2 to be operated by an end user, an aerial imaging operation guidance device 6 which displays an aerial image 5 for guiding (indicating) the position over which the end user is to place a 2D code 4 displayed on a smartphone 3.

In effect, the aerial imaging operation guidance device 6 has an aerial imaging module 7 and an image reading camera 8 built therein, and the aerial image 5 can be displayed at the focal position on the center line of the image reading camera 8, which is indicated with a broken line K1, by the aerial imaging module 7. Consequently, by the end user placing the smartphone 3 displaying the 2D code 4 over the image reading camera 8 at the foregoing position of the aerial image 5, the 2D code 4 displayed on the smartphone 3 can be read by the image reading camera 8.

Figure 2:
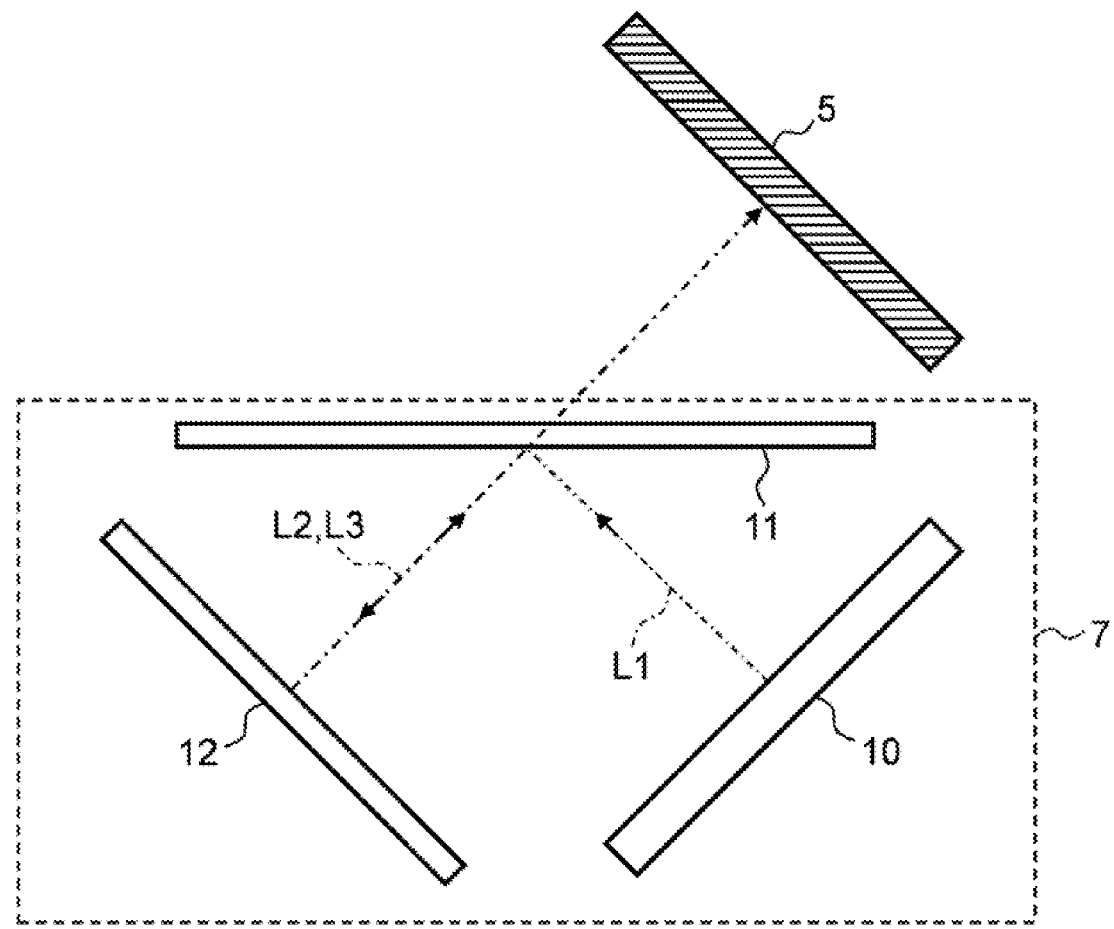
FIG. 2 is a conceptual diagram showing a configuration of an AIRR-type aerial imaging module.

FIG. 2 shows a configuration example of the aerial imaging module 7 in a case where aerial imaging technology referred to as AIRR (aerial imaging by retro-reflection) is applied. With the aerial imaging module 7, when the source image of the aerial image 5 is displayed on a display 10 configured from a liquid crystal panel or the like, half of a beam L1 diffused from the display 10 is reflected by a half mirror 11.

Moreover, a reflected light L2 of the beam L1 reflected by the half mirror 11 is reflected at the same angle as the incidence angle by a retroreflective material 12, and the half mirror 11 is once again irradiated with the reflected light L2. Because the half mirror 11 allows half of the beam of the reflected light L3 from the retroreflective material 12 to pass therethrough, the image displayed on the display 10 is aerially formed, and the aerial image 5 that is visible to the human eye is optically configured. The aerial image 5 is characterized in being aerially formed at a position of a plane symmetry that is entirely the same as the positional relationship of the display 10 and the half mirror 11.

Figure 3:
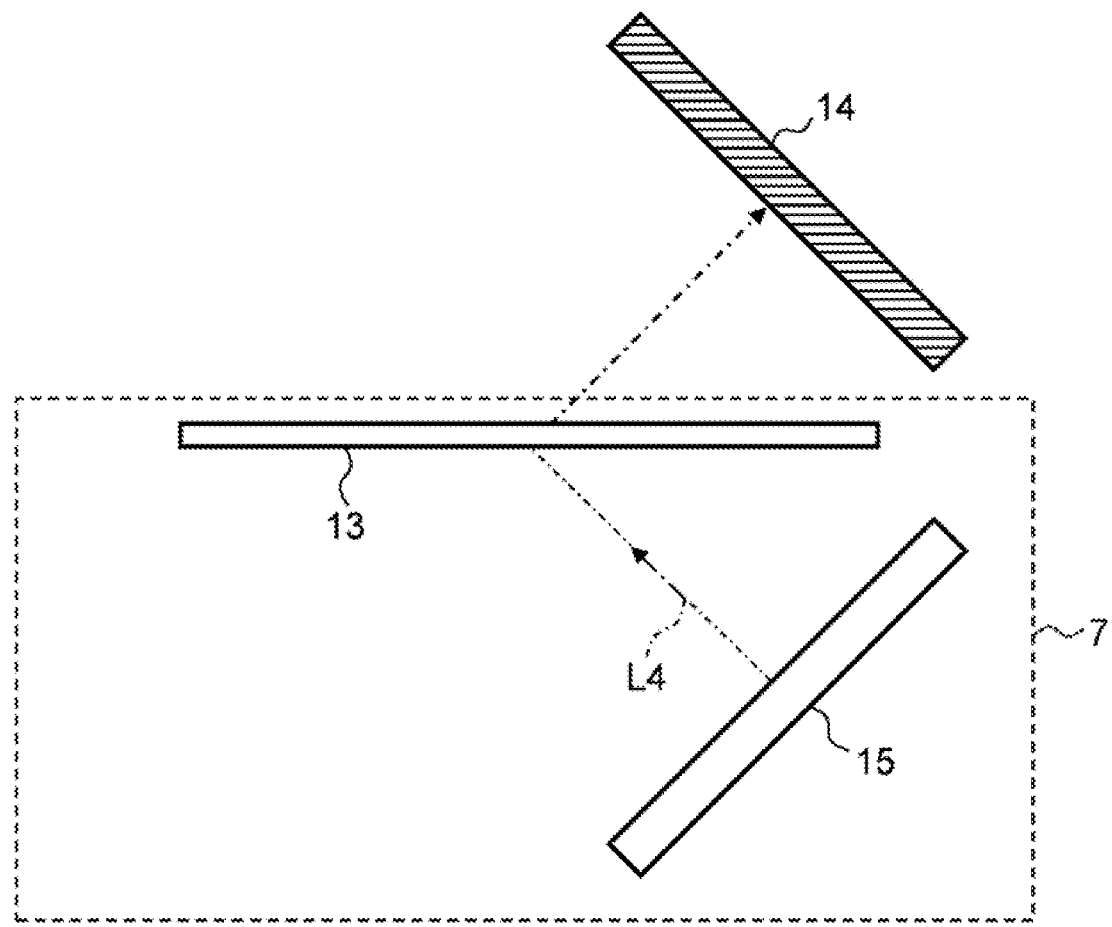
FIG. 3 is a conceptual diagram showing a configuration of a dihedral reflector-type aerial imaging module.

FIG. 3 shows a configuration example of the aerial imaging module 7 using an aerial imaging plate 13 configured from a dihedral reflector. When the source image of the aerial image 14 is displayed on the display 15, a beam L4 diffused from the display 15 enters the aerial imaging plate 13, and forms an aerial image 14. The aerial image 14 is characterized in being aerially formed at a position of a plane symmetry that is entirely the same as the positional relationship of the display 10 and the aerial imaging plate 13. While the structure of the overall module is different, the display 15 is the same as the display 10 of FIG. 2, and the aerial image 14 that is aerially formed is the same as the aerial image 5 of FIG. 2.

Figure 4:
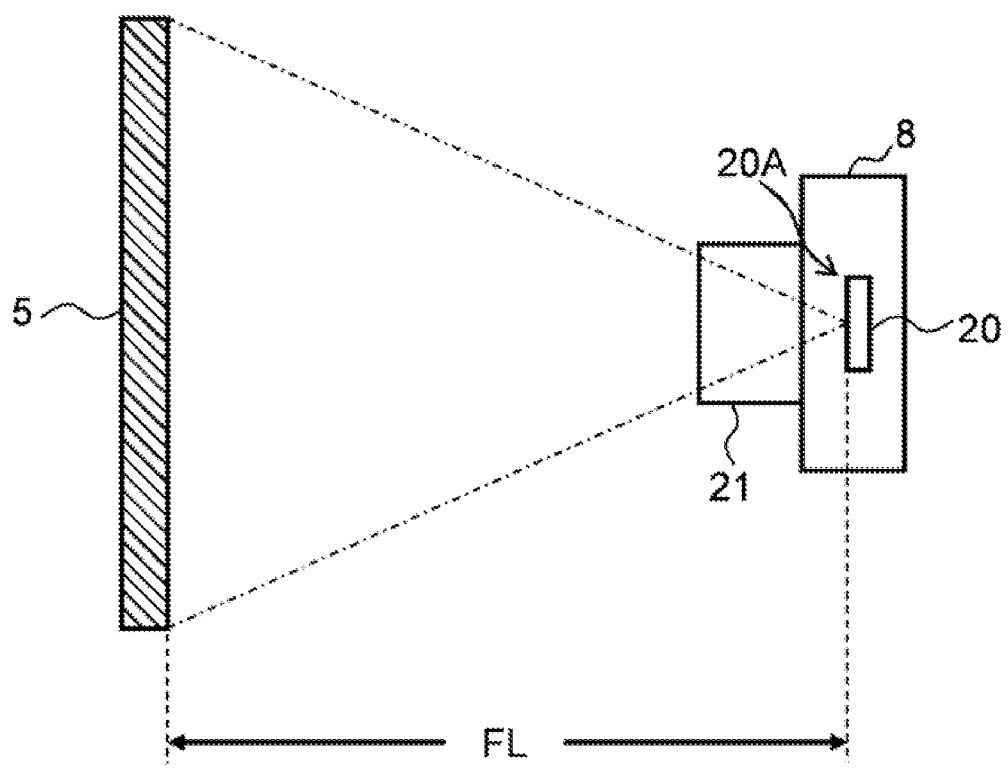
FIG. 4 is a conceptual diagram explaining a display position of an aerial image relative to an image reading camera.

FIG. 4 shows a schematic configuration of the image reading camera 8 and the peripheral structure. The image reading camera 8 comprises an image sensor 20 such as a CMOS (Complementary Metal Oxide Semiconductor) or a CCD (Charge Coupled Device) which converts images into data. A lens 21 is used for forming an image on a light receiving surface 20A of the image sensor 20. A focal length FL of the lens 21 for forming a clear image on the light receiving surface 20A of the image sensor 20 is physically determined based on the combination of number, size and other factors regarding the lens 21. The focal length FL of the lens 21 is set to a distance which enables the clear reading of the 2D code 4 displayed on the smartphone 3 (FIG. 1) which is placed in conformity with the aerial image 5.

Figure 5A:
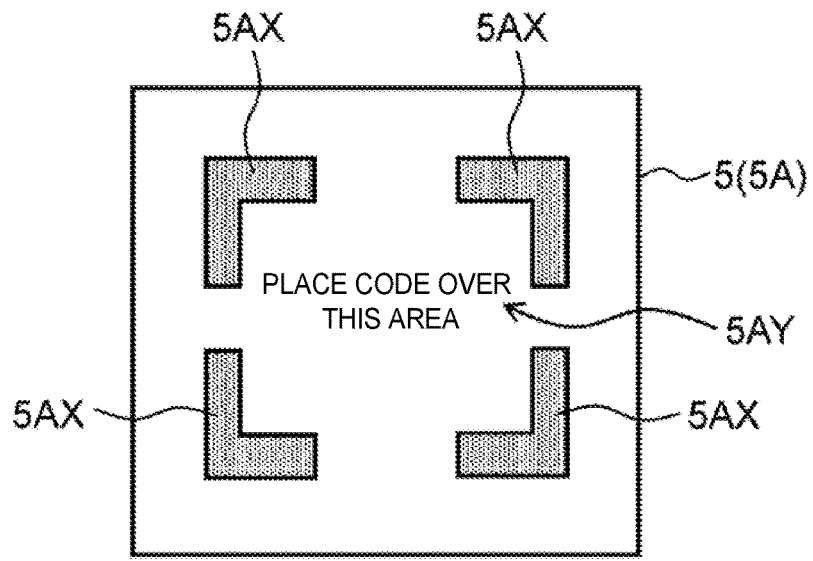
FIG. 5A is a diagram showing a display example of an aerial image.
Figure 5B:
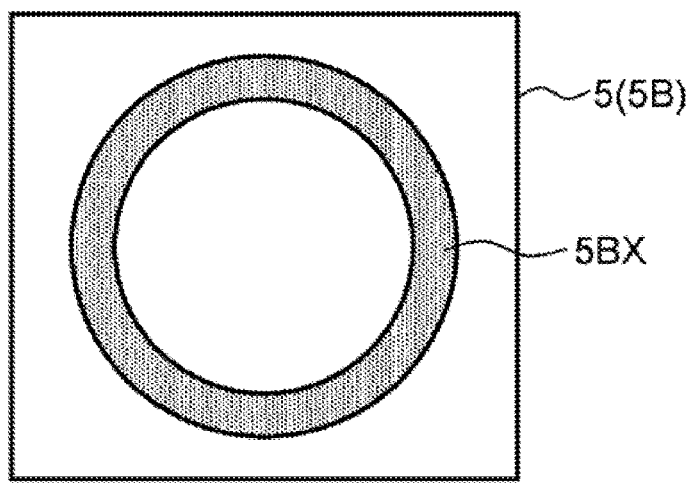
FIG. 5B is a diagram showing a display example of an aerial image.
Figure 5C:
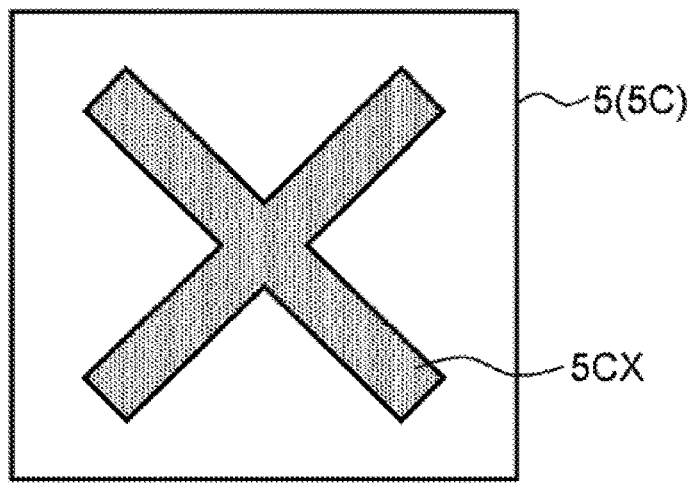
FIG. 5C is a diagram showing a display example of an aerial image.

FIG. 5A to FIG. 5C show specific display examples of the aerial image 5. FIG. 5A is a display example of the aerial image 5 (5A) for indicating the area over which the end user is to place the 2D code 4 (FIG. 1) displayed on the smartphone 3 (FIG. 1), and is configured from an L-shaped symbol 5AX positioned at the four corners and a character string 5AY of a message such as "Place code over this area".

Moreover, FIG. 5B is a display example of the aerial image 5 (5B) which is displayed when the automatic transaction apparatus 1 was successful in reading the 2D code 4 displayed on the smartphone 3 placed by the end user, and is configured from a symbol 5BX such as "○" which enables the end user to easily recognize that the reading of the 2D code 4 was successful. Furthermore, FIG. 5C is a display example of the aerial image 5 (5C) which is displayed when the automatic transaction apparatus 1 was unsuccessful in reading the 2D code 4 displayed on the smartphone 3 placed by the end user, and is configured from a symbol 5CX such as "×" which enables the end user to easily recognize that the reading of the 2D code 4 was unsuccessful.

The switching of the aerial images 5 (5A to 5C) of FIG. 5A to FIG. 5C is performed under the control of a controller (not shown) which is provided within the automatic transaction apparatus 1 and governs the operational control of the overall automatic transaction apparatus 1. However, an appropriate aerial image 5 may also be displayed (aerially formed) at a proper timing by providing a dedicated display controller for controlling the image displayed on the display 10, 15 (FIG. 2, FIG. 3), and a controller (not shown), which governs the operational control of the overall automatic transaction apparatus 1, switching the display image of the display 10, 15 via the display controller.

In addition to the aerial image 5B of FIG. 5B and the aerial image 5C of FIG. 5C, the success or failure of the reading of the 2D code 4 by the image reading camera 8 may also be notified to the end user using a chime sound or other sounds, or a verbal message such as "Please place the 2D code over this area again".

Figure 6:
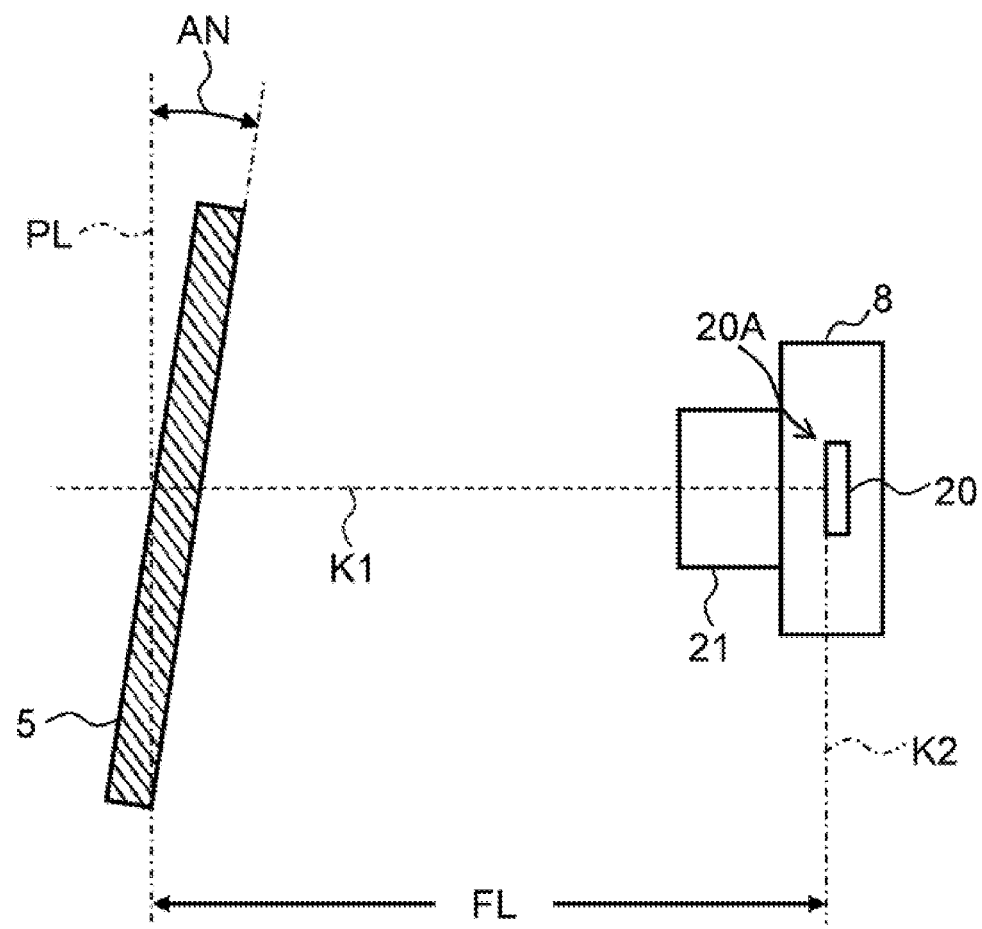
FIG. 6 is a conceptual diagram explaining a display state of an aerial image.

FIG. 6 shows the positional relationship of the aerial image 5 displayed by the aerial imaging operation guidance device 6 (FIG. 1) and the image reading camera 8 within the aerial imaging operation guidance device 6. In FIG. 6, a dashed-dotted line K2 represents the position of a light receiving surface 20A of the image sensor 20 built in the image reading camera 8. In the ensuing explanation, this position is referred to as the "surface position" of the image sensor 20. Moreover, in FIG. 6, a broken line K1 represents a center line of the lens 21 which passes through the center of the light receiving surface 20A of the image sensor 20. In the ensuing explanation, this center line is referred to as the "image sensor center line".

Here, the aerial image 5 is displayed at a position which matches the focal length FL of the image reading camera 8. The aerial image 5 is displayed in a state where an upper side of the aerial image 5 in a vertical direction viewed from the end user relative to a virtual plane (plane that is perpendicular to the central axis of the lens 21 of the image reading camera 8; hereinafter referred to as the "focal parallel plane") PL that is parallel to the light receiving surface 20A of the image sensor 20, which is separated from the surface position of the image sensor 20 at a distance corresponding to the focal length FL of the image reading camera 8, is slanted at a predetermined angle (hereinafter referred to as the "display angle AN") in a depth direction (direction of the image reading camera 8).

The display angle AN is preferably set to roughly 5 degrees. As a result of setting the display angle AN to roughly 5 degrees as described above, the operability can be improved as the visibility from the end user's eye line to the depth direction will improve.

In effect, when placing the 2D code 4 displayed on the smartphone 3 (FIG. 1) toward the image reading camera 8, if the display angle AN is 0 degrees (that is, if the aerial image 5 is parallel to the focal parallel plane PL), as the smartphone 3 is moved toward the image reading camera 8, the 2D code 4 displayed on the smartphone 3 will overlap with the aerial image 5 and, when moved too far, it becomes easier to lose sight of the guide (aerial image 5) as the part of the 2D code 4 that overlaps with the aerial image 5 will disappear from the field of view.

Nevertheless, by slanting the 2D code 4 at roughly 5 degrees relative to the aerial image 5, as the 2D code 4 of the smartphone 3 is moved toward the image reading camera 8 in the same manner, the end user can confirm the optimal depth intuitively because the depth can be visually confirmed as a result of the aerial image 5 being slanted from the focal parallel plane PL. Furthermore, for instance, when the aerial imaging operation guidance device 6 is disposed on a plane that is perpendicular to the automatic transaction apparatus 1 as shown in FIG. 1 (hereinafter simply referred to as the "perpendicular plane 1A"), by slanting the aerial image 5 displayed by the aerial imaging operation guidance device 6 relative to the perpendicular plane 1A, it is possible to eliminate the glare of light from the ceiling area lighting or the like on the display surface of the smartphone 3. Thus, the image of the 2D code 4 read by the image reading camera 8 will be clear, and the accuracy of the reading of the 2D code 4 by the aerial imaging operation guidance device 6 will improve.

FIG. 7A to FIG. 7E show screen configuration examples of the respective screens that are suitably displayed on the touch panel display 2 of the automatic transaction apparatus 1 upon conducting transactions using the 2D code 4.

Foremost, prior to starting a transaction with the automatic transaction apparatus 1, the end user completes the prior input of the transaction details, converts such details into a 2D code 4, and displays the 2D code 4 on the smartphone 3 (FIG. 1).

Figure 7A:
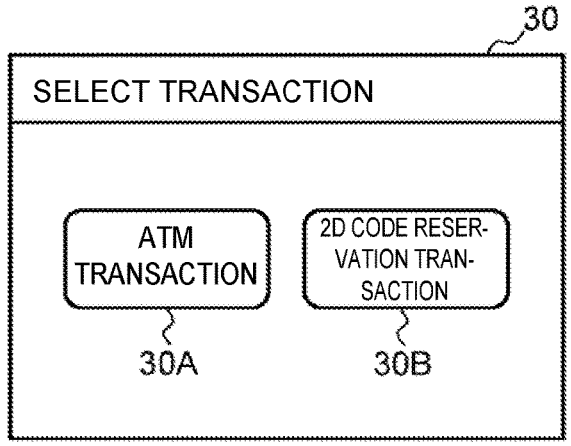
FIG. 7A is a diagram showing a screen configuration example of various screens displayed on a touch panel display of the automatic transaction apparatus.
Figure 7B:
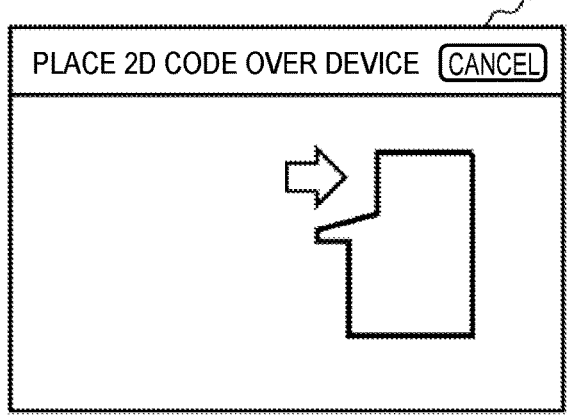
FIG. 7B is a diagram showing a screen configuration example of various screens displayed on a touch panel display of the automatic transaction apparatus.

Meanwhile, a menu screen 30 shown in FIG. 7A is initially displayed on the touch panel display 2 of the automatic transaction apparatus 1. Subsequently, the end user starts the transaction by touching a transaction menu button 30B for conducting the transaction using the 2D code 4 displayed on the smartphone 3 (hereinafter referred to as the "2D code reservation transaction button 30B") among transaction menu buttons 30A, 30B displayed in the menu screen 30. When the end user touches the 2D code reservation transaction button 30B, the display screen of the touch panel display 2 of the automatic transaction apparatus 1 is switched to a guidance screen 31 shown in FIG. 7B.

Next, the end user places the 2D code 4 displayed on the smartphone 3 over the aerial imaging operation guidance device 6 mounted on the perpendicular plane 1A of the automatic transaction apparatus 1 according to the instructions of the guidance screen 31 displayed on the touch panel display 2.

Here, the aerial imaging operation guidance device 6 aerially forms the aerial image 5 (5A) described above with reference to FIG. 5A to indicate the specific position over which the 2D code 4 should be placed. Here, the expression "specific position over which the 2D code 4 should be placed" is the position where the aerial image 5 (5A) is displayed, and is the focal position of the image reading camera 8. Here, by displaying some kind of character or symbol on the touch panel display 2, it is also possible to guide the position over which the end user should place the 2D code 4 displayed on the smartphone 3 in the vertical or horizontal direction.

Because the aerial image 5 (5A) that was aerially formed by the aerial imaging operation guidance device 6 is slanted at roughly 5 degrees relative to the light receiving surface 20A (FIG. 4) of the image sensor 20 (FIG. 4) of the image reading camera 8, it is possible to prevent the glare of environmental ambient light, such as the ceiling area lighting, on the display screen of the smartphone 3. The image reading camera 8 can thereby clearly read the 2D code 4.

When the image reading camera 8 of the aerial imaging operation guidance device 6 is successful in reading the 2D code 4 placed by the end user over the image reading camera 8, the aerial image 5 (5B) described above with reference to FIG. 5B is displayed to visually inform the end user that the reading of the 2D code 4 was successful. Moreover, if the image reading camera 8 was unable to read the 2D code 4 place by the end user over the image reading camera 8 for some reason, the aerial image 5 (5C) described above with reference to FIG. 5C is displayed to visually inform the end user that the reading of the 2D code 4 was unsuccessful, and urge the end user to once again place the 2D code 4 over the position of the aerial image 5 (5A) of FIG. 5A.

Figure 7C:
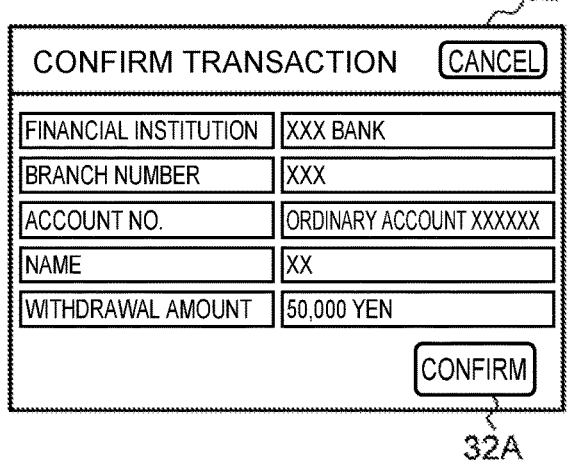
FIG. 7C is a diagram showing a screen configuration example of various screens displayed on a touch panel display of the automatic transaction apparatus.

When the automatic transaction apparatus 1 is successful in reading the 2D code 4, a transaction confirmation screen 32 as shown in FIG. 7C based on the read 2D code 4 is displayed on the touch panel display 2. Note that FIG. 7C is an example of the transaction confirmation screen 32 in a case where the transaction requested by the end user is the withdrawal of cash. The end user thereafter confirms the transaction details displayed on the transaction confirmation screen 32, and presses a confirmation button 32A if everything is in order. Consequently, the transaction processing by the automatic transaction apparatus 1 is executed.

Figure 7D:
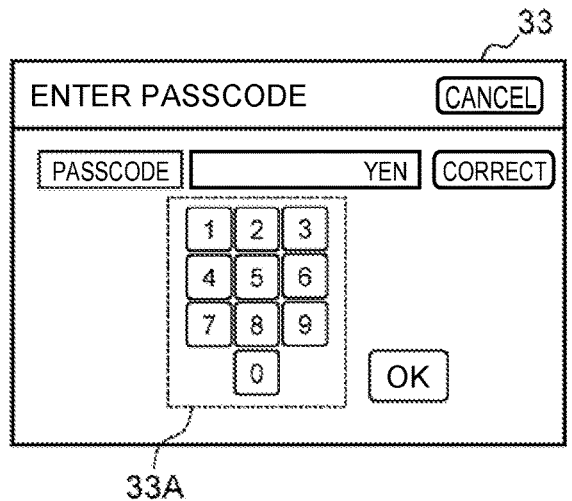
FIG. 7D is a diagram showing a screen configuration example of various screens displayed on a touch panel display of the automatic transaction apparatus.

Subsequently, a passcode input screen 33 as shown in FIG. 7D comprising a numeric keypad 33A is displayed on the touch panel display 2. The end user thereafter presses the corresponding numbers of the numeric keypad 33A displayed on the passcode input screen 33 and enters one's passcode. The reason why the entry of the passcode is requested is to only allow the actual person to conduct the transaction even in cases where the 2D code 4 falls into the hands of another user and such 2D code 4 is maliciously or erroneously used.

Figure 7E:
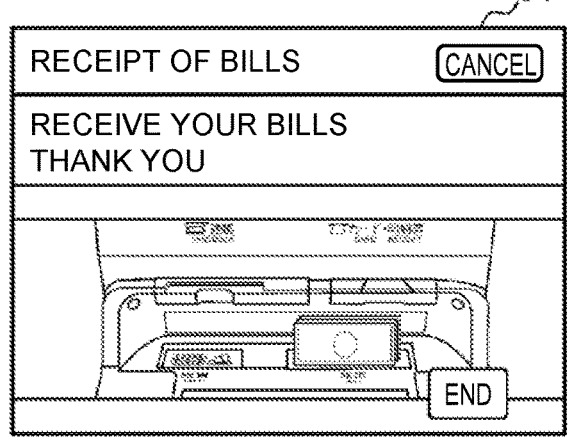
FIG. 7E is a diagram showing a screen configuration example of various screens displayed on a touch panel display of the automatic transaction apparatus.

When the passcode entered by the end user is correct, bills in the requested amount are paid out, and a guide image 34 as shown in FIG. 7E is displayed on the touch panel display 2 to urge the end user to receive the bills.

As described above, with the automatic transaction apparatus 1 of this embodiment, because the aerial imaging operation guidance device 6 is used to display the aerial image 5 (5A) shown in FIG. 5A at the position over which the end user should place the 2D code 4, the end user can conduct a transaction using the 2D code 4 merely by placing the 2D code 4 displayed on the smartphone 3 at a position which conforms with the aerial image 5 (5A).

Thus, according to the automatic transaction apparatus 1, a physical structure for indicating the position over which the end user should place the 2D code 4 is not required, the end user can intuitively perform operations (transactions), and the image reading camera 8 can accurately read the 2D code 4 placed by the end user over the image reading camera 8.

Moreover, according to the automatic transaction apparatus 1, because the end user will place the 2D code 4 displayed on the smartphone 3 at a position which conforms with the aerial image 5 (5A) that was aerially formed at a position away from the automatic transaction apparatus 1, it is possible to dramatically reduce the possibility of the end user erroneously causing one's smartphone 3 to collide with the automatic transaction apparatus 1.

Thus, according to this embodiment, it is possible to realize an automatic transaction apparatus of a simple configuration which can be easily operated intuitively by the operator, and which enables the accurate reading of the 2D code while dramatically reducing the possibility of the end user damaging his/her smartphone or the like.

(2) Second Embodiment

Figure 8:
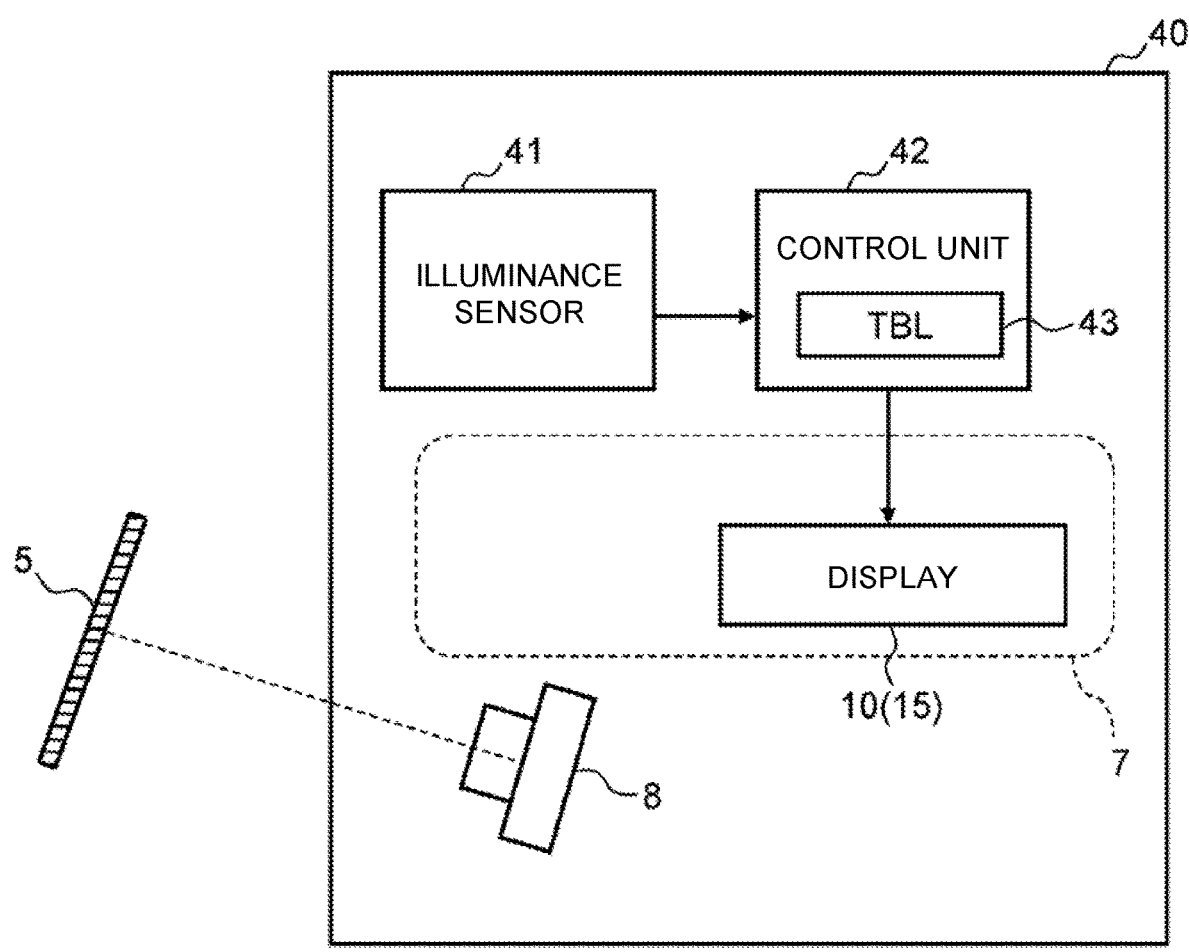
FIG. 8 is a conceptual diagram showing a schematic configuration of the aerial imaging operation guidance device according to the second embodiment.

FIG. 8, in which parts corresponding to FIG. 1 are given the same reference numeral, shows an aerial imaging operation guidance device 40 according to the second embodiment to be applied to the automatic transaction apparatus 1 of FIG. 1 in substitute for the aerial imaging operation guidance device 6 of the first embodiment described above.

The aerial imaging operation guidance device 40 differs from the aerial imaging operation guidance device 6 of the first embodiment with respect to the point of comprising an illuminance sensor 41 and a control unit 42 in addition to the image reading camera 8 and the aerial imaging module 7 of the first embodiment, and is otherwise configured in the same manner as the aerial imaging operation guidance device 6 of the first embodiment.

Here, the illuminance sensor 41 detects the brightness around the automatic transaction apparatus 1 (hereinafter referred to as the "outside illuminance"), and notifies the detection result to the control unit 42. Moreover, the control unit 42 controls the brightness of the aerial image 5 to be displayed by the aerial imaging operation guidance device 40 based on the outside illuminance notified from the illuminance sensor 41.

Figure 9:
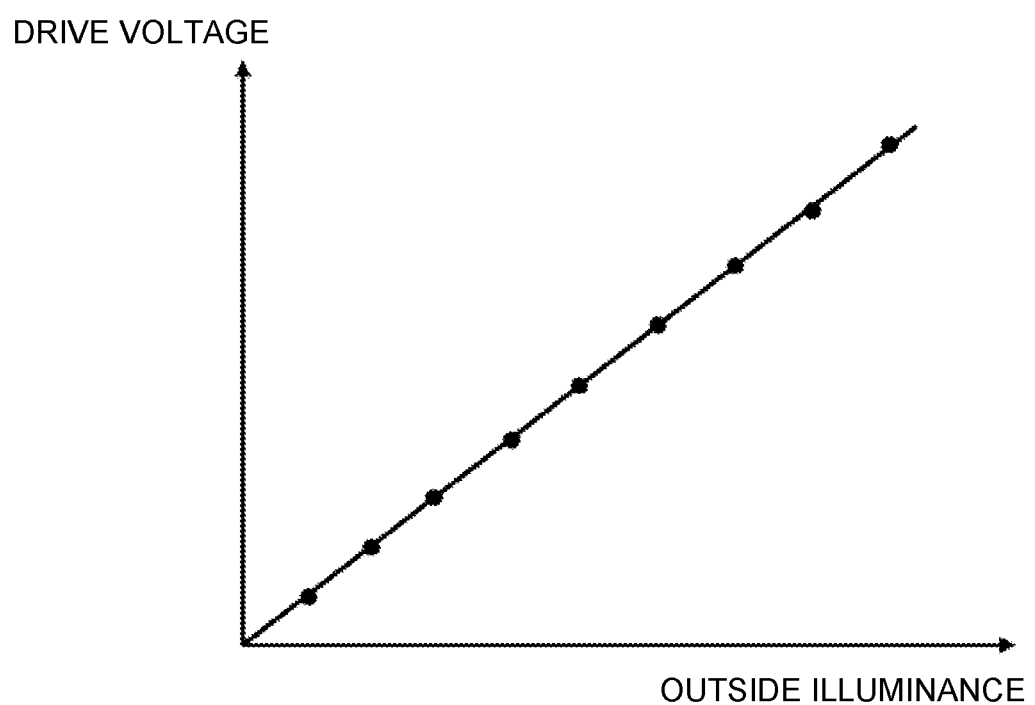
FIG. 9 is a graph showing a correspondence relationship of the outside illuminance, and the drive voltage of the backlight of the display.

In effect, in this embodiment, the brightness of the aerial image 5 relative to the outside illuminance is prescribed in advance for each outside illuminance in regular intervals. Furthermore, the control unit 42 comprises, as shown in FIG. 9, a table (hereinafter referred to as the "outside illuminance-drive voltage association table") 43 which pre-stores the drive voltage for each outside illuminance to be applied to the backlight of the display 10(15) for displaying the aerial image 5 at the corresponding brightness.

Subsequently, when the outside illuminance is notified from the illuminance sensor 41, the control unit 42 reads, from the outside illuminance-drive voltage association table 43, the drive voltage of the backlight of the display 10(15) that was pre-set relative to the notified outside illuminance, and applies the read drive voltage to the backlight of the display 10(15). The aerial image 5 is thereby displayed at the brightness according to the outside illuminance.

Accordingly, with the aerial imaging operation guidance device 40 of this embodiment, because the aerial image 5 is displayed at the brightness according to the outside illuminance, it is possible to prevent a situation where the aerial image 5 becomes difficult to see due to the brightness around the automatic transaction apparatus 1. Thus, according to the aerial imaging operation guidance device 40 of this embodiment, it is possible to improve the end user's operability, and further improve the reading accuracy of the 2D code 4 placed by the end user over the image reading camera 8.

(3) Other Embodiments

While the first and second embodiments described above explained a case where the aerial imaging operation guidance device 6, 40 displays the aerial image 5 in a state of being slanted roughly 5 degrees in the depth direction, the present invention is not limited thereto, and the display angle AN of the aerial image 5 may be set to be smaller or greater than 5 degrees. For example, when placing the 2D code 4 displayed on the smartphone 3 over the automatic transaction apparatus 1, because it would be easier for the end user to slant the smartphone 3 at roughly 30 to 45 degrees ergonomically, the aerial image 5 may also be displayed in a state of being slanted at such angle.

Moreover, while the first and second embodiments described above explained a case where the image to be displayed on the smartphone 3 and placed over the aerial imaging operation guidance device 6 by the end user is a 2D code 4, the present invention is not limited thereto, and the present invention can be broadly applied even in cases where the image to be displayed on the smartphone 3 and placed over the aerial imaging operation guidance device 6 by the end user is a bar code or similar codes other than the 2D code 4, or any other image of a character or a symbol.

INDUSTRIAL APPLICABILITY

The present invention can be broadly applied to various image reading devices which optically read images.

REFERENCE SIGNS LIST

1 . . . automatic transaction apparatus, 2 . . . touch panel display, 3 . . . smartphone, 4 . . . 2D code, 5, 5A to 5C . . . aerial image, 5AX, 5BX, 5CX . . . symbol, 5AY . . . character string, 6, 40 . . . aerial imaging operation guidance device, 7 . . . aerial imaging module, 8 . . . image reading camera, 10, 15 . . . display, 20 . . . image sensor, 41 . . . illuminance sensor, 42 . . . control unit, 43 . . . outside illuminance-drive voltage association table, AN . . . display angle, FL . . . focal length.

The invention claimed is:

1. An image reading device which optically reads an image, comprising:
   a camera configured to read the image; and
   an aerial imager configured to aerially form a first aerial image, which indicates a position over which the image is to be placed, at a focal position of the camera,
   wherein the aerial imager is configured to aerially form the first aerial image in a state where an upper side of the first aerial image, the upper side being in a vertical direction relative to a plane perpendicular to a central axis of a lens of the camera, is slanted in a direction of the camera at an angle of about 5°, and
   wherein the aerial imager comprises:
     an illuminance sensor configured to detect outside illuminance; and
     a controller configured to control brightness of the first aerial image to be aerially formed at the focal position of the camera according to the outside illuminance detected by the illuminance sensor, wherein the brightness is controlled based on a table containing pre-stored drive voltage information associated with the outside illuminance.

2. The image reading device according to claim 1, wherein the aerial imager is configured to aerially form a second aerial image, which represents a success or a failure of reading of the image by the camera, at a focal position of the camera.

3. An image reading method to be executed by an image reading device which optically reads an image, comprising:
   a first step of aerially forming a first aerial image, which indicates a position over which the image is to be placed; and
   a second step of reading, with a camera, the image placed over the position which conforms with the first aerial image,
   wherein, in the first step, the first aerial image is aerially formed at a focal position of the camera,
   wherein, in the first step, the first aerial image is aerially formed in a state where an upper side of the first aerial image, the upper side being in a vertical direction relative to a plane that is perpendicular to a central axis of a lens of the camera, is slanted in a direction of the camera at an angle of about 5°,
   wherein, in the first step, outside illuminance is detected, and brightness of the first aerial image to be aerially formed at the focal position of the camera is controlled according to the detected outside illuminance, and
   wherein the brightness is controlled based on a table containing pre-stored drive voltage information associated with the outside illuminance.

4. The image reading method according to claim 3, further comprising:
   a third step of aerially forming a second aerial image, which represents a success or a failure of reading of the image by the camera, at a focal position of the camera.

* * * * *